United States Patent
Shivadas et al.

(10) Patent No.: US 9,344,517 B2
(45) Date of Patent: May 17, 2016

(54) DOWNLOADING AND ADAPTIVE STREAMING OF MULTIMEDIA CONTENT TO A DEVICE WITH CACHE ASSIST

(71) Applicant: Sonic IP, Inc., San Diego, CA (US)

(72) Inventors: Abhishek Shivadas, San Diego, CA (US); Eric Grab, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 429 days.

(21) Appl. No.: 13/852,501

(22) Filed: Mar. 28, 2013

(65) Prior Publication Data
US 2014/0297881 A1  Oct. 2, 2014

(51) Int. Cl.
*H04L 29/08* (2006.01)
*H04L 29/06* (2006.01)

(52) U.S. Cl.
CPC ........ *H04L 67/2861* (2013.01); *H04L 65/4084* (2013.01); *H04L 65/4092* (2013.01); *H04L 65/80* (2013.01); *H04L 67/2842* (2013.01); *H04L 67/2847* (2013.01)

(58) Field of Classification Search
CPC ............ H04L 67/2861; H04L 65/4084; H04L 67/2842; H04L 65/80; H04L 65/4092
See application file for complete search history.

(56) References Cited

U.S. PATENT DOCUMENTS

| | | | |
|---|---|---|---|
| 5,361,332 A | 11/1994 | Yoshida et al. | |
| 5,404,436 A | 4/1995 | Hamilton | |
| 6,031,622 A | 2/2000 | Ristow et al. | |
| 6,155,840 A | 12/2000 | Sallette | |
| 6,195,388 B1 | 2/2001 | Choi et al. | |
| 6,658,056 B1 | 12/2003 | Duruöz et al. | |
| 6,807,306 B1 | 10/2004 | Girgensohn et al. | |
| 6,859,496 B1 | 2/2005 | Boroczky et al. | |
| 6,956,901 B2 | 10/2005 | Boroczky et al. | |
| 7,242,772 B1 | 7/2007 | Tehranchi | |
| 7,478,325 B2 | 1/2009 | Foehr | |
| 7,610,365 B1 * | 10/2009 | Kraft et al. | 709/223 |
| 7,991,156 B1 | 8/2011 | Miller | |
| 8,023,562 B2 | 9/2011 | Zheludkov et al. | |

(Continued)

FOREIGN PATENT DOCUMENTS

| | | |
|---|---|---|
| EP | 813167 A2 | 12/1997 |
| JP | 2004013823 A | 1/2004 |

(Continued)

OTHER PUBLICATIONS

"Supported Media Formats", Supported Media Formats, Android Developers, Nov. 27, 2013, 3 pgs.

(Continued)

*Primary Examiner* — Chris Parry
*Assistant Examiner* — Daeoo Lee
(74) *Attorney, Agent, or Firm* — KPPB LLP

(57) ABSTRACT

An apparatus operates in an offline mode and a playback mode, and includes a relatively large cache buffer. In the offline mode, the apparatus is configured download multimedia content identified in a user content queue, over a communication network, into the cache buffer. In the playback mode, after the multimedia content has been downloaded in the offline mode, the apparatus fetches content from the cache buffer and plays back the fetched content on the client device until all of the content in the cache buffer has been fetched and played back. Then the apparatus streams content over the communication network and plays back the streamed content.

20 Claims, 9 Drawing Sheets

(56) References Cited

U.S. PATENT DOCUMENTS

| | | | |
|---|---|---|---|
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,291,460 B1 | 10/2012 | Peacock | |
| 8,311,115 B2 | 11/2012 | Gu et al. | |
| 8,321,556 B1 | 11/2012 | Chatterjee et al. | |
| 8,386,621 B2 | 2/2013 | Park | |
| 8,412,841 B1 | 4/2013 | Swaminathan et al. | |
| 8,456,380 B2 | 6/2013 | Pagan | |
| 8,472,792 B2 | 6/2013 | Butt | |
| 8,914,534 B2 | 12/2014 | Braness et al. | |
| 2003/0002578 A1 | 1/2003 | Tsukagoshi et al. | |
| 2003/0061369 A1 | 3/2003 | Aksu et al. | |
| 2003/0152370 A1 | 8/2003 | Otomo et al. | |
| 2003/0231863 A1 | 12/2003 | Eerenberg et al. | |
| 2003/0231867 A1 | 12/2003 | Gates et al. | |
| 2003/0233464 A1 | 12/2003 | Walpole et al. | |
| 2003/0236836 A1 | 12/2003 | Borthwick | |
| 2003/0236907 A1 | 12/2003 | Stewart et al. | |
| 2004/0136698 A1 | 7/2004 | Mock | |
| 2004/0158878 A1 | 8/2004 | Ratnakar et al. | |
| 2005/0038826 A1 | 2/2005 | Bae et al. | |
| 2005/0114896 A1 | 5/2005 | Hug | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0026294 A1 | 2/2006 | Virdi et al. | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckx-Deleersnijder et al. | |
| 2007/0168541 A1 | 7/2007 | Gupta et al. | |
| 2007/0168542 A1 | 7/2007 | Gupta et al. | |
| 2007/0180125 A1 | 8/2007 | Knowles et al. | |
| 2007/0239839 A1 | 10/2007 | Buday et al. | |
| 2007/0292107 A1 | 12/2007 | Yahata et al. | |
| 2008/0101466 A1 | 5/2008 | Swenson et al. | |
| 2008/0120389 A1 | 5/2008 | Bassali et al. | |
| 2008/0126248 A1 | 5/2008 | Lee et al. | |
| 2008/0137736 A1 | 6/2008 | Richardson et al. | |
| 2008/0192818 A1 | 8/2008 | DiPietro et al. | |
| 2008/0195744 A1 | 8/2008 | Bowra et al. | |
| 2008/0256105 A1 | 10/2008 | Nogawa et al. | |
| 2008/0263354 A1 | 10/2008 | Beuque | |
| 2008/0279535 A1 | 11/2008 | Haque et al. | |
| 2008/0310454 A1 | 12/2008 | Bellwood et al. | |
| 2008/0310496 A1 | 12/2008 | Fang | |
| 2009/0031220 A1 | 1/2009 | Tranchant et al. | |
| 2009/0037959 A1 | 2/2009 | Suh et al. | |
| 2009/0048852 A1 | 2/2009 | Burns et al. | |
| 2009/0055546 A1 | 2/2009 | Jung et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0132824 A1 | 5/2009 | Terada et al. | |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0226148 A1 | 9/2009 | Nesvadba et al. | |
| 2009/0293116 A1 | 11/2009 | Demello | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0040351 A1 | 2/2010 | Toma et al. | |
| 2010/0074324 A1 | 3/2010 | Qian et al. | |
| 2010/0083322 A1 | 4/2010 | Rouse | |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0158109 A1 | 6/2010 | Dahlby et al. | |
| 2010/0186092 A1 | 7/2010 | Takechi et al. | |
| 2010/0189183 A1 | 7/2010 | Gu et al. | |
| 2010/0228795 A1 | 9/2010 | Hahn et al. | |
| 2010/0235472 A1 | 9/2010 | Sood et al. | |
| 2011/0047209 A1 | 2/2011 | Lindholm et al. | |
| 2011/0060808 A1* | 3/2011 | Martin et al. | 709/217 |
| 2011/0066673 A1 | 3/2011 | Outlaw | |
| 2011/0080940 A1 | 4/2011 | Bocharov | |
| 2011/0082924 A1 | 4/2011 | Gopalakrishnan | |
| 2011/0126191 A1 | 5/2011 | Hughes et al. | |
| 2011/0129011 A1 | 6/2011 | Cilli et al. | |
| 2011/0142415 A1 | 6/2011 | Rhyu | |
| 2011/0145726 A1 | 6/2011 | Wei et al. | |
| 2011/0149753 A1 | 6/2011 | Bapst et al. | |
| 2011/0150100 A1 | 6/2011 | Abadir | |
| 2011/0153785 A1 | 6/2011 | Minborg et al. | |
| 2011/0197237 A1 | 8/2011 | Turner | |
| 2011/0225315 A1 | 9/2011 | Wexler et al. | |
| 2011/0225417 A1 | 9/2011 | Maharajh et al. | |
| 2011/0239078 A1 | 9/2011 | Luby et al. | |
| 2011/0246657 A1 | 10/2011 | Glow | |
| 2011/0246659 A1 | 10/2011 | Bouazizi | |
| 2011/0268178 A1 | 11/2011 | Park | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2011/0314500 A1 | 12/2011 | Gordon et al. | |
| 2012/0023251 A1 | 1/2012 | Pyle et al. | |
| 2012/0093214 A1 | 4/2012 | Urbach | |
| 2012/0144117 A1* | 6/2012 | Weare et al. | 711/119 |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0179834 A1 | 7/2012 | van der Schaar et al. | |
| 2012/0254455 A1 | 10/2012 | Adimatyam et al. | |
| 2012/0278496 A1 | 11/2012 | Hsu | |
| 2012/0289147 A1* | 11/2012 | Raleigh et al. | 455/3.06 |
| 2012/0307883 A1 | 12/2012 | Graves | |
| 2013/0044821 A1 | 2/2013 | Braness et al. | |
| 2013/0046902 A1 | 2/2013 | Villegas Nuñez et al. | |
| 2013/0061045 A1 | 3/2013 | Kiefer et al. | |
| 2013/0166765 A1 | 6/2013 | Kaufman | |
| 2013/0166906 A1 | 6/2013 | Swaminathan et al. | |
| 2013/0173513 A1* | 7/2013 | Chu et al. | 706/14 |
| 2014/0059156 A1* | 2/2014 | Freeman et al. | 709/213 |
| 2014/0101722 A1 | 4/2014 | Moore | |
| 2014/0189065 A1 | 7/2014 | Schaar et al. | |

FOREIGN PATENT DOCUMENTS

| | | |
|---|---|---|
| JP | 2004172830 A | 6/2004 |
| JP | 2007036666 A | 2/2007 |
| JP | 2007535881 A | 12/2007 |
| JP | 2014506430 A | 3/2014 |
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2010147878 A1 | 12/2010 |

(56) References Cited

FOREIGN PATENT DOCUMENTS

| WO | 2012094171 A1 | 7/2012 |
|---|---|---|
| WO | 2012094181 A2 | 7/2012 |
| WO | 2012094189 A1 | 7/2012 |

OTHER PUBLICATIONS

European Search Report for Application 11855103.5, search completed Jun. 26, 2014, 9 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.
ITS International, "Fleet System Opts for Mobile Server", Aug. 26, 1999, 1 page.
"Transcoding Best Practices", From movideo, Nov. 27, 2013, 5 pgs.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Tunneling QuickTime RTSP and RTP over HTTP", Published by Apple Computer, Inc.: 1999 (month unknown), 6 pages.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Kim, Kyuheon, "MPEG-2 ES/PES/TS/PSI", Kyung-Hee University, Oct. 4, 2010, 66 pages.
Nelson, "Smooth Streaming Deployment Guide", Microsoft Expression Encoder, Aug. 2010, 66 pgs.
Noe, A., "Matroska File Format (under construction!)", Retrieved from the Internet: URL:http://web.archive.orgweb/20070821155146/www.matroska.org/technical/specs/matroska.pdf, retrieved on Jan. 19, 2011, Jun. 24, 2007, 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R, "HTTP Live Streaming: draft-pantos-http-live-streaming-06", Published by the Internet Engineering Task Force (IETF), Mar. 31, 2011, 24 pages.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", In China Communications, Oct. 2006, pp. 30-44.
Zambelli, Alex "IIS Smooth Streaming Technical Overview", Microsoft Corporation, Mar. 2009.

\* cited by examiner

DOWNLOADING AND ADAPTIVE STREAMING OF MULTIMEDIA CONTENT TO A DEVICE WITH CACHE ASSIST

BACKGROUND

Distribution of multimedia content (also referred to herein as "media" and/or "program(s)"), such as movies and the like, from network services to a client device may be achieved through adaptive bitrate streaming of the content. Typically, in response to a user request to view content entered through a client device Graphical User Interface (GUI), the client device initiates a streaming session with a network service to stream the requested content to the client device for playback. Each time a user wishes to view another title, the user must submit a further request to stream that title. Accordingly, conventional streaming requires a high level of user interaction, which may be bothersome, especially to a busy user.

Conventional client devices, such as personal computers, tablets, smartphones, and the like, host a multitude of applications, have access to a wide range of data services, and store a variety of personal information, using, e.g., electronic calendars and planners. Conventional streaming solutions are limited in that they fail to take advantage of attributes offered by the aforementioned features in a way that either improves the user multimedia experience or reduces the repetitive interactions associated with the conventional solutions.

Figure 1:
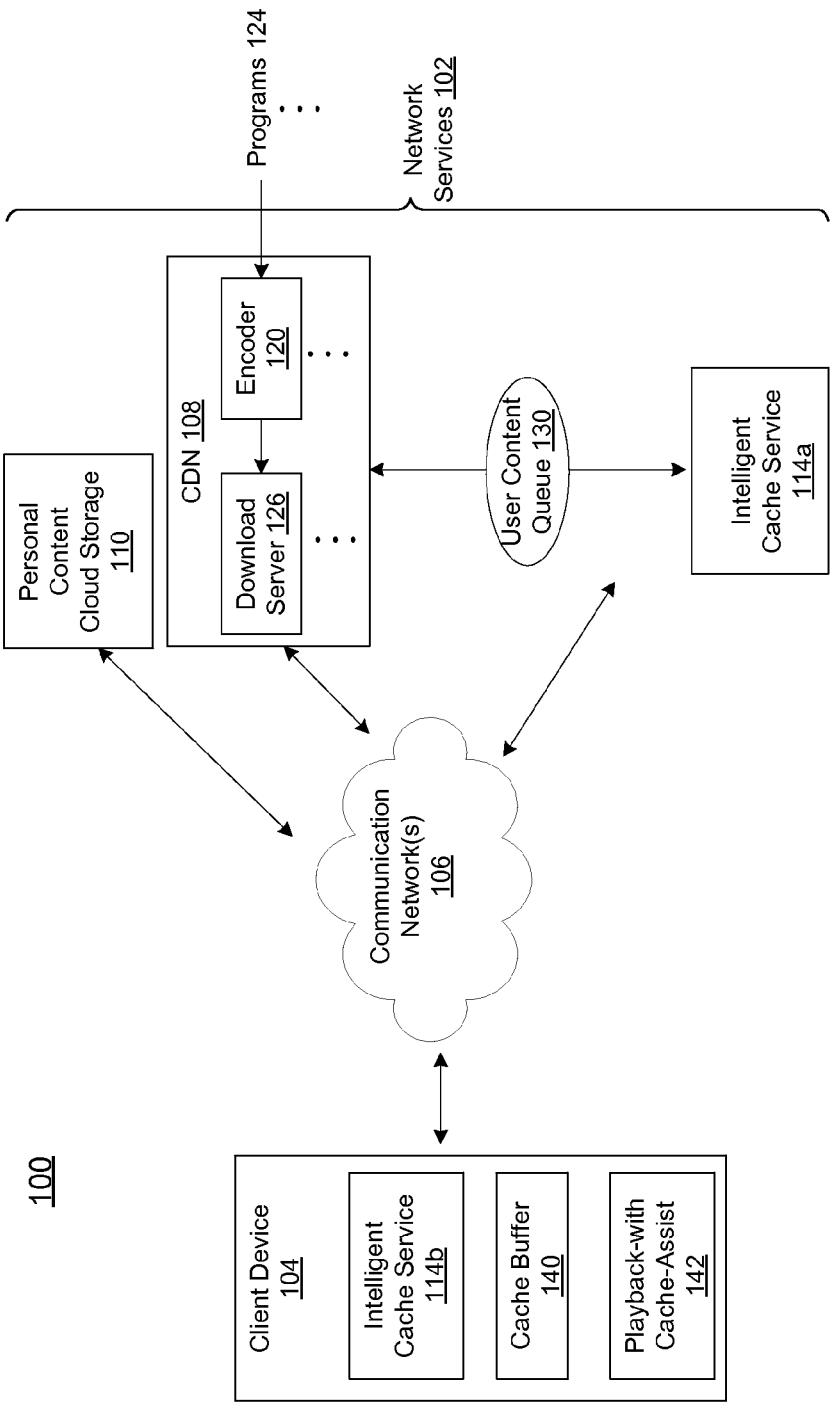
FIG. 1 is a block diagram of an example network environment in which embodiments directed to downloading and adaptive streaming of multimedia content to a device with cache assist may be implemented.

In the drawings, the leftmost digit(s) of a reference number identifies the drawing in which the reference number first appears.

DETAILED DESCRIPTION

Network Environment

FIG. 1 is a block diagram of an example network environment 100 in which embodiments directed to downloading and adaptive streaming of multimedia content to a device with cache assist may be implemented. The embodiments combine downloading of large amounts of multimedia content to a large cache buffer (hence the term "cache assist") of the client device while the client device is in an offline mode, with subsequent playback of the downloaded content and then streaming of further content (for playback) while the client device is in a playback mode. During the offline mode, the downloading of content advantageously proceeds without the need for user interaction and in a manner that leverages or takes advantage of applications, calendars, and data available to or hosted on the client device, as will be described more fully below.

Network environment 100 includes a collection of server-side or network services 102 (also referred to simply as "services 102") and a client-side device 104 (also referred to as "client device 104" or "client 104"). Network services 102 may be implemented as Internet cloud-based services. Network services 102 interact and cooperate with each other, and with client device 104, to manage and download multimedia content to the client device, over one or more communication networks 106, such as the Internet. Network services 102 communicate with each other and with client device 104 using any suitable communication protocol, such as an Internet protocol, which may include Transmission Control Protocol/Internet Protocol (TCP/IP), Hypertext Transfer Protocol (HTTP), etc., and other non-limiting protocols described herein.

Network services 102 include, but are not limited to, a content delivery network (CDN) 108, personal content cloud storage 110, and a server-side intelligent cache service 114a. Each of services 102 may be implemented as one or more distinct computer servers that execute one or more associated server-side computer program applications suited to the given service.

CDN 108 includes encoders 120 to encode multimedia source content or programs 124, and download servers 126 to store the resulting encoded content for subsequent download to client device 104. Content 124 may be from any number of multimedia content providers that originate live and/or pre-recorded multimedia content. Providers, such as Netflix®, HBO®, cable and television networks, and so on, may provide their content in the form of programs, including, but not limited to, entertainment programs (e.g., television shows, movies, cartoons, news programs, etc.), educational programs (e.g., classroom video, adult education video, learning programs, etc.), and advertising programs (e.g., commercials, infomercials, or marketing content).

Cloud storage 110 stores multimedia content associated with, and personal to, a user of client device 104, such as pictures and videos, which may be uploaded from client device 104 to the cloud storage, and then downloaded from the cloud storage to the client device at a later time.

Environment 100 includes an intelligent cache service 114, comprising server-side intelligent cache service 114a and a client-side intelligent cache service 114b hosted in client device 104. Intelligent cache services 114a, 114b of cache service 114 exchange messages and data over networks 106 to manage downloads of content from network services 102, as identified in a user content queue 130, to client device 104, while the client device operates in an offline mode, as will be described more fully below. Typically, user content queue 130 may be created by a user of client device 104, and is personal to that user (and the client device). User content queue 130 may be hosted in intelligent cache service 114a or elsewhere in network services 102. An example of user content queue 130 is described below in connection with FIG. 2.

Client device 104 may be capable of wireless and/or wired communication with networks 106, and includes processing, storage, communication, and user interface capabilities sufficient to provide all of the client device functionality described herein. Client device 104 includes client device functionality provided, at least in part, by applications, such as computer programs, that execute on client device 104. Such applications may include:

a. a graphical user interface (GUI) through which the user of the client device may (i) request services from corresponding server-side applications hosted in services 102, and (ii) invoke the offline mode and a playback mode (i.e., "playback") of client device 104 (described further below);
 b. client-side intelligent cache service 114b, which is a peer application to server-side application 114a; and
 c. a "playback with cache assist" 142.

In accordance with embodiments described herein, client device 104 operates in an offline mode and a playback mode. The client device GUI may be used to initiate, and switch between, the two modes, which may be mutually exclusive. During the offline mode the following conditions of client device 104 apply:

a. the client device may communicate with networks 106;
 b. intelligent cache service 114a (and its peer 114b) is active and playback-with-cache-assist 142 is inactive; and
 c. the client device does not engage in a playback session to playback content, namely, client device does not playback content from local memory (i.e., from memory within the client device), nor does the client device perform adaptive streaming from network services 102 to playback content.

Client device 104 may automatically enter the offline mode if a user has not interacted with the client device, e.g., through the GUI or otherwise, for a predetermined period of time, e.g., several hours. Alternatively, the user may "click" an icon to activate an associated application hosted on client device 104, and thereby force the client device into the offline mode. During the offline mode, intelligent cache service 114a manages (with its peer service 114b) downloading of content identified in user content queue 130 to a relatively large cache buffer 140 in client device 104. An example size of cache buffer 140 is over one gigabyte (GB), preferably many GB, or even in the Terabyte range, so as to be able to store sufficient program content, e.g., multiple downloaded programs, e.g., movies in their entirety, to provide many hours of playback time at client device 104. Other sizes of cache buffer 140 are possible.

After the content has been downloaded into cache buffer 140, the playback mode of client device 104 may be invoked. The playback mode is used to initiate playback sessions in client device 104 so as to playback, at least in part, content downloaded to cache buffer 140 during the offline mode. In an example, a user of client device 104 may "click" on an icon to open a corresponding multimedia playback application hosted on the client device, to thereby invoke the playback mode (i.e., transition from the offline mode to the playback mode).

During the playback mode, the following conditions apply: client device 104 may communicate with networks 106; and intelligent cache service 114a and (114b) is inactive, and playback-with-cache-assist 142 is active. Once invoked, during the playback mode, playback-with-cache-assist 142 fetches the content previously downloaded into cache buffer 140 for playback, until the cache buffer is empty. Once cache buffer 140 is empty, playback-with-cache-assist 142 initiates adaptive streaming of content from network services 102, to continue playback of the content from the point at which the cache buffer was emptied, in a seamless manner.

It is to be understood that the multimedia content downloaded to client device 104 during the offline mode and streamed to the client device during the playback mode is, in both cases, typically encoded content that must be decoded at the client device during playback. This encoded content is referred to herein simply as "content" for simplicity. Accordingly, references herein to downloading and streaming "content" mean downloading and streaming "encoded content."

Figure 2:
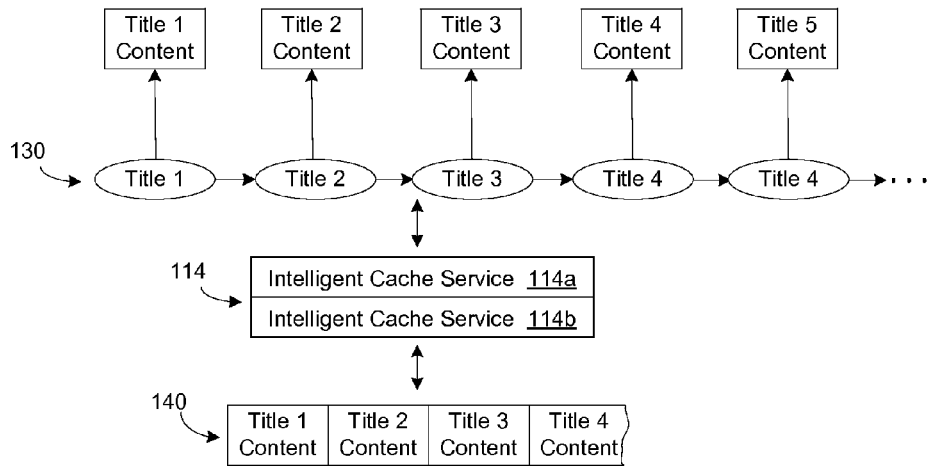
FIG. 2 is a block diagram of example operations and associated elements in the environment of FIG. 1 that are active during an offline mode.

FIG. 2 is a block diagram of example operations and associated elements 200 in environment 100 that are active during the offline mode.

As depicted in FIG. 2, user content queue 130 is represented as a list of program titles Title 1-Title N, each to represent an address of a corresponding encoded content file stored in network services 102, e.g., in one of download servers 126 of CDN 108, or in personal content cloud storage 110. Therefore, addresses Title 1-Title N identify one or more files of encoded content that may be accessed for download from the addresses to client device 104. Titles 1-N may include program titles from content providers, such as Netflix®, HBO®, and other cable networks. Titles 1-N may also include titles pointing to content stored in cloud storage 110. One or more of Titles 1-N may cause other content queues to be incorporate into user content queue 130, i.e., the user content queue may include multiple sub-queues.

When client device 104 is in the offline mode, intelligent cache service 114 (through peer services 114a, 114b) traverses addresses Title 1-Title N in user content queue 130 in order to access and download the corresponding (i.e., addressed) content, e.g., the corresponding content file, to cache buffer 140. In the example, cache buffer 140 is large enough to store the content for each of Titles 1-3 in its entirety. However, cache buffer 140 is not large enough to store all of the content for Title 1. Therefore, only a first portion or segment of the content for Title 4 is able to be downloaded to cache buffer 140, leaving remaining segments of Title 4 in network services 102 (e.g., in CDN 108). Once intelligent cache service 114 has completely filled cache buffer 140, client device 104 may transition out of the offline mode.

Figure 3:
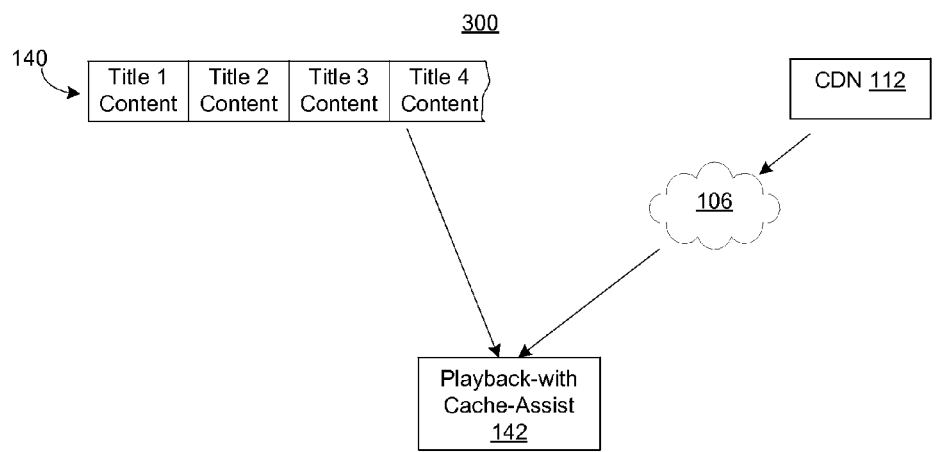
FIG. 3 is a block diagram of example operations and associated elements of the environment of FIG. 1 that are active during a playback mode.

FIG. 3 is a block diagram of example operations and associated elements 300 of environment 100 that are active during the playback mode, i.e., in playback. After intelligent cache service 114 has loaded cache buffer 140 with content, i.e., pre-loaded the cache buffer with the content, the playback mode may be invoked to playback the content on client device 104, i.e., present the content on the client device. Once invoked, in the playback mode, playback-with-cache-assist 142 fetches content from cache buffer 140 for playback on client device 104. In an embodiment, content is fetched from cache buffer 140 for playback in an order in which it is stored in the cache buffer, e.g., in the order Title 1, Title 2, and so on. Playback-with-cache-assist 142 continues to fetch content from cache buffer 140 for playback until the cache buffer is empty, i.e., the last segment of content stored in the cache buffer has been fetched for playback. In the example, cache buffer 140 becomes empty after the content for Title 1-Title 3 and the first segment or portion of content for Title 4 is fetched from the buffer.

After the last segment of content stored in cache buffer 140 has been fetched, i.e., the cache buffer is empty, then playback-with-cache-assist 142 initiates a streaming session with network services 102 to continue playback of content as necessary, i.e., to stream for playback any remaining content, so as to provide seamless playback of the content. For example, streaming is initiated to stream the remaining segments or portions of content for Title 4 from network services 102 (e.g., CDN 108) to client device 104 for seamless playback of Title 4 in its entirety at the client device. Note that for seamless playback, playback-with-cache-assist 142 may initiate streaming of remaining content at a time before cache buffer 140 is actually emptied, e.g., several segments before the last segment is fetched and played, so that the streamed remaining segments are in client device 104 and ready for playback the moment the last segment is fetched and playback.

Factors Influencing Downloaded Content in Offline Mode

As described above, in an embodiment, while client device 104 is in the offline mode, intelligent cache service 114 traverses user content queue 140 to download to cache buffer 140 content identified in the queue. In other embodiments, intelligent cache service 114 may determine/identify content to be downloaded from services 102 to cache buffer 140 other than that identified in the user content queue based on a variety of different inputs, as is now described with reference to FIG. 4.

Figure 4:
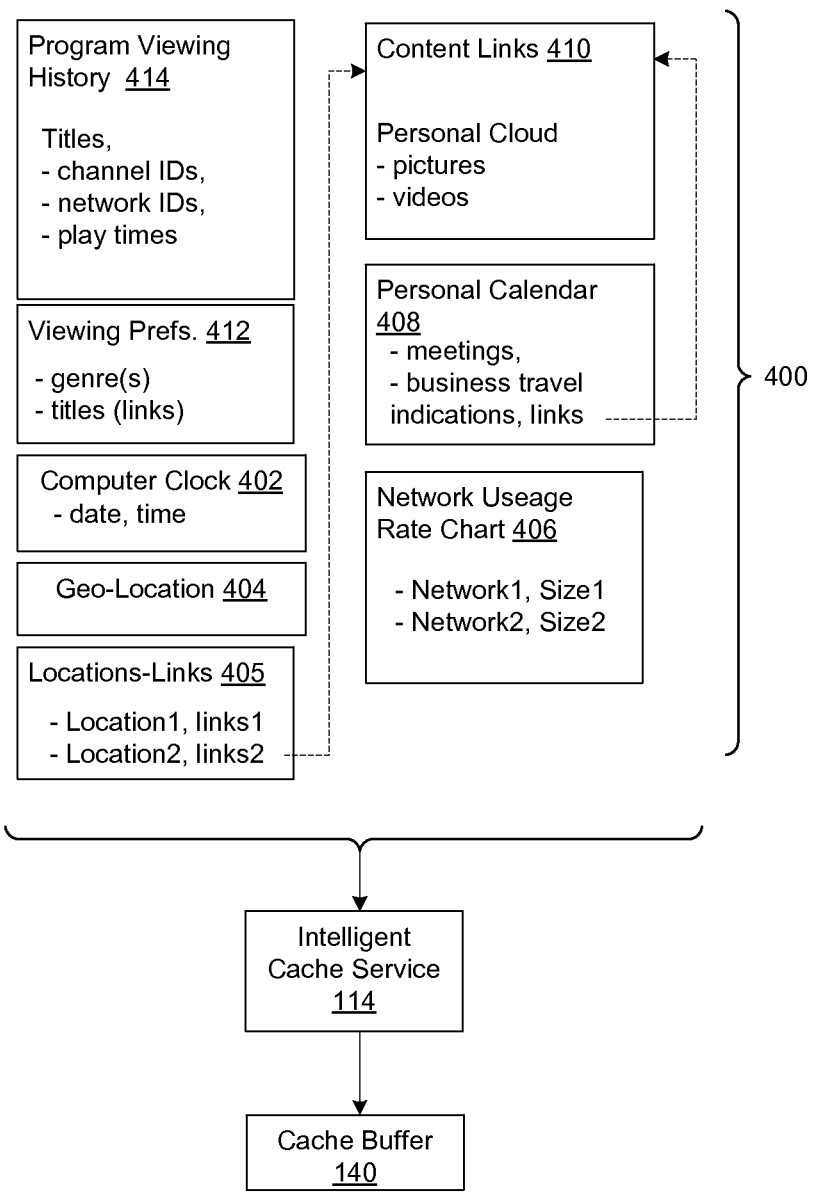
FIG. 4 is a block diagram of example inputs that the intelligent cache service may use to further identify content for download to a cache buffer of a client device.

FIG. 4 is a block diagram of example inputs 400 that intelligent cache service 114 may use to further identify content for download to cache buffer 140. In other words, inputs 400 depicted in FIG. 4 represent factors that influence the content downloaded to cache buffer 140.

Inputs 400 include the following:

a computer clock 402 of client device 104 to provide current clock date and time inputs to intelligent cache service 114;

a Geo-location Service 404, such as a Global Positioning Service (GPS), of client device 104 to provide geo-location (also referred to as "location") of the client device to the intelligent cache service;

a Locations vs. Address Links ("Location-Links") database 405 in client device 104, and accessible to the intelligent cache service, that lists different possible geo-locations and/or travel destinations for client device 104, and one or more corresponding links to content corresponding to each of the possible client device locations. A link may be a network address, such as a Universal Resource Locator (URL), that identifies, i.e., points to, content in network services 102. Also, a link may include a pointer to another database of inputs 400 that contains further links to content in network services 102. For example, Location-Links database 405 may include links (shown in dotted line in FIG. 4) to a Content Links database 410, described below. Links in database 405 identify content in network services 102 to be downloaded to cache buffer 140 if the geo-location of client device 104, as reported by Geo-location Service 404, coincides with or is near (e.g., within a geo-radius of a prescribed number of miles, such as 50 miles) the client device location corresponding to that link (e.g. address);

a Network Usage Rate Chart 406 stored in client device 104, and accessible the intelligent cache service, that lists different networks (e.g., Network1, Network2) over which client device 104 may communicate and downloaded content and, for each network, a corresponding upper limit or maximum amount of data in bytes (e.g., size1 for Network1, size2 for Network2) that may downloaded over that network in a given time period, e.g., 30 days;

a Personal Calendar 408 stored in client device 104, and accessible to the intelligent cache service, including entries to indicate meeting dates, times, and subjects (e.g., subject: "business travel"). Similar to Locations-Links database 405, Personal calendar 408 may include links (shown in dotted line) to Content Links database 410;

Content Links database 410 stored in client device 104, and accessible to the intelligent cache service, including a set of links directed to personal cloud storage sites for, e.g., personal videos and pictures stored in the cloud storage 110;

Viewing Preferences 412 stored in client device 104, and accessible to the intelligent cache service, to list favorite viewing preferences, such as genre(s) (e.g., comedy, horror, etc.), and specific program titles corresponding to the genre(s) and available for download from network services 102. Each title may be associated with a link to its corresponding content; and Program Viewing History 414, stored in client device 104, and accessible to intelligent cache services, to provide an ordered list of the most common viewing sources of a user of the client device, as tracked over time. Program Viewing History 414 may include, e.g., commonly viewed program titles, and for each of the titles, a channel ID, a network ID, and airtimes, as appropriate, and a link (e.g., network address) where the title may be accessed.

Various ones of inputs 400, including Viewing Preferences database 412, Locations-Links database 405, Content Links database 410, Personal Calendar 408, and Network Usage Rate chart 406, may each be populated by a user of client device 104 through one or more GUIs associated with the particular input. Program Viewing History 414 may be populated automatically over time by a viewing history application that monitors viewing choices/selections over time.

Download Based on Geo-Location

Intelligent cache service 114 may download content based on (i) a geo-location of client device 104 as reported by Geo-location Service 404, and (ii) the content as identified in Locations-Links database 405. That is, as Geo-Location service 404 reports geo-locations of client device 104 listed in Locations-Links database 405, intelligent cache service 114 may download the content identified for, or corresponding to, that geo-location in the database. In an example, links1 in Location-Links database 405, corresponding to geo-location1, may point to content, such as pictures and videos, uploaded to cloud storage 110. When the geo-location of client device 104 as reported by Geo-Location Service 404 coincides with, i.e., is at or near, location1, then intelligent cache service 114 downloads the indicated pictures and videos at links1 from cloud storage 110. In another embodiment, the links in Location-Links database 405 (e.g., links1, links2) for corresponding to geo-locations (e.g., location1, location 2) in Location-Links database 405 may include further links to Content Links database 410. In this embodiment, when the geo-location of client device 104 coincides with the locations listed in Locations-Links database 405, then the content identified by corresponding links in Content Links database 410 is downloaded to cache buffer 140.

Download Based on Business Travel

Personal calendar 408 may include an entry indicating a date and time on which a user associated with client device 104 (and the calendar) is scheduled for business travel. The business travel calendar entry may be flagged as "business travel" in calendar 408, e.g., in a subject line of the calendar entry. The business travel entry of calendar 408 may be linked to Content Links database 410, or one or more of Viewing Preferences 412, and Program Viewing History 414.

Intelligent cache service 114 may search the entries of Personal Calendar 408 for business travel dates and times. When a calendar date and time for business travel matches the current date and time provided by computer clock 402, then intelligent cache service 114 may download content as identified in Content Links database 410, or one or more of Viewing Preferences 412, and Program Viewing History 414, that are linked to Personal Calendar 408.

Download Based on Network Data Usage Rates

Depending on geo-location, client device 104 may connect to and download content into cache buffer 140 over many different types of communication networks e.g., 3G and 4G networks, correspondingly operated by different network operators (e.g., Verizon, Sprint®, etc.). 3G, short for third Generation, is the 3rd generation of mobile telecommunications technology and corresponds to a set of standards used for mobile devices and mobile telecommunication services and networks that comply with the International Mobile Telecommunications-2000 (IMT-2000) specifications by the International Telecommunication Union. 4G is the fourth generation of mobile phone mobile communication technology standards. It is a successor of the third generation (3G) standards.

Typically, networks provide data access in accordance with corresponding data plans that specify data usage rates, e.g., a first network ("Network1" in rate chart 406 of FIG. 4) may cost $30/month to download 250 megabytes (MB) of data ("Size1" in rate chart 406 of FIG. 4) over the month, a second network ("Network2") may cost $35/month to download 2.5 gigabytes of data ("Size2"), and so on.

In order to avoid excessive data download overage fees, it is advantageous to limit the size of content downloads to cache buffer 140 over a given time period based on the data usage rates for the different networks over which the downloads are made. To this end, intelligent cache service 114 determines the identity and type of a network to which client device 104 is connected for downloading content into cache buffer 140 (e.g., 3G or 4G). Then, intelligent cache service 114 determines an upper limit or maximum amount of content (e.g., in bytes) that may be downloaded to cache buffer 140 based on the determined network. Intelligent cache service 114 uses the determined network as an index into network usage rate chart 406 to locate the corresponding download size limit/maximum. For example, if the determined network is Network1, then the corresponding download limit/maximum is size1. Intelligent cache service limits the size of downloads to cache buffer 104 to the determined maximum amount over a given time period.

Adaptive Bitrate Streaming in Playback Mode

As mentioned above, client device 104 may perform adaptive bitrate streaming in the playback mode. In adaptive bitrate streaming, client device 104 determines an available bandwidth for downloading content, and then downloads the content from network services 102 encoded at a maximum encoding bitrate suited to the determined available bandwidth. To support adaptive bitrate streaming, CDN 108 creates and stores alternative bitrate streams each encoded with the same content but in accordance but with different encoding parameters/settings, such as at different encoding bitrates, resolutions, and/or frame rates, and so on. Each of the bitstreams may comprise sequential files of encoded content, referred to as container files. While streaming such encoded content from CDN 108, client device 104 may switch between streams (and thus between encoded bitrates and corresponding streaming rates) according to conditions at the client device, such as the determined available bandwidth.

Figure 5:
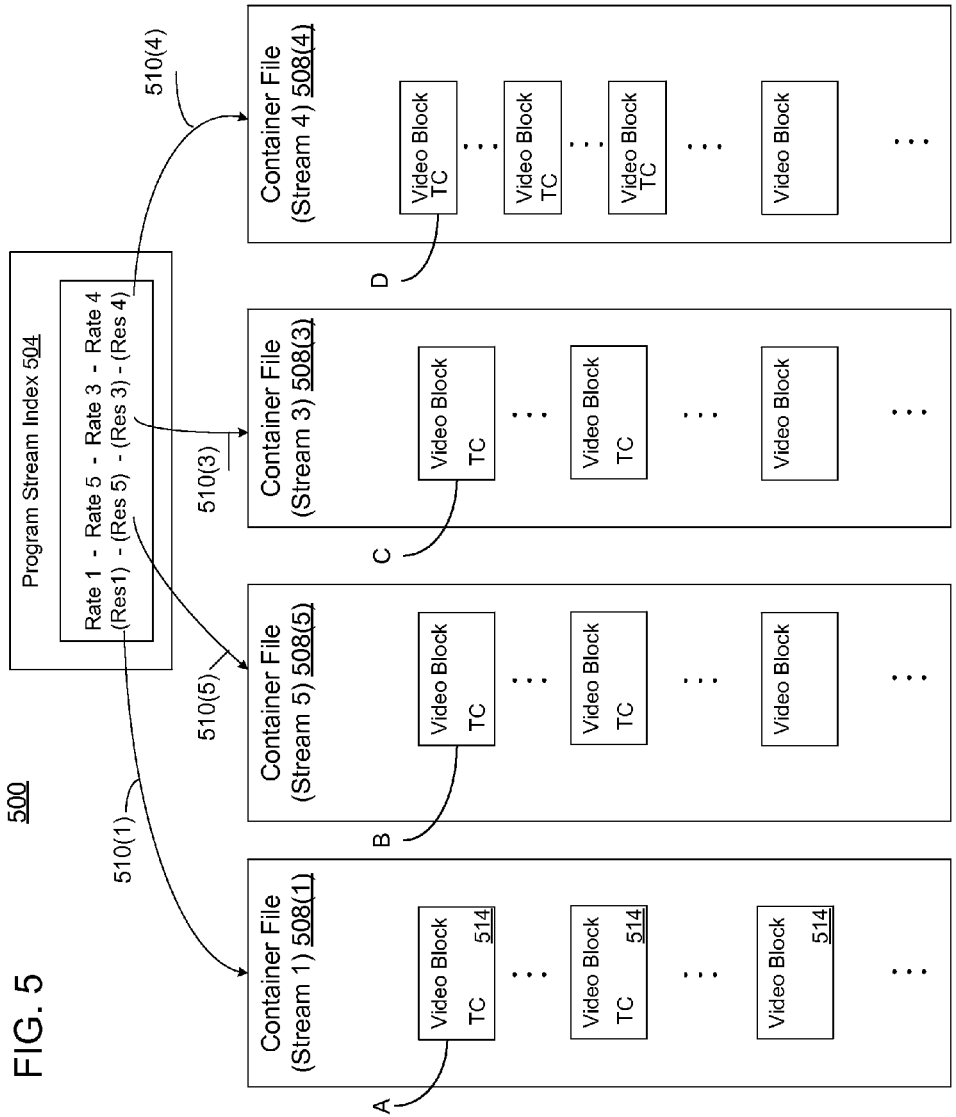
FIG. 5 is an illustration of an example encoded video program generated by and stored in a content delivery network.

FIG. 5 is an illustration of an example encoded video program 500 generated by and stored in CDN 108. Encoded video program 500 includes multiple (encoded) video streams 1-4 encoded at multiple corresponding bitrates Rate 1-Rate 4. Exemplary, non-limiting, bitrates may range from below 125 kilo-bits-per-second (kbps) up to 15,000 kbps, or even higher, depending on the type of encoded media (i.e., content). Encoded video streams 1-4 encode video at multiple video resolutions Res 1-Res 4, which may be equal to or different from each other. Encoded video program 200 includes a program stream index 504 and multiple container files 508(1)-508(4) corresponding to streams 1-4, respectively.

Program stream index 504 includes address pointers 510 (1)-(4), e.g., URLs, to corresponding container files 508(1)-(4), and lists encoding parameters used to encode each of the streams 1-4, including, but not limited to, encoded bitrates Rate 1-Rate 4, encoding resolutions Res 1-Res 4, frame rates, and encoding techniques/standards. Exemplary, non-limiting, bitrates may range from below 125 kilo-bits-per-second (kbps) up to 15,000 kbps, or even higher, depending on the type of encoded media.

In an embodiment, each of container files 508 comprises sequential blocks 514 of encoded content (which may also include audio, text, multimedia, etc., in addition to video). Each block includes a time code TC indicating a start time and end time for the content encoded in the block. An exemplary duration of an encoded video block is two seconds of video.

Each of the blocks 514 in a given one of container files 508 may encode the same content (e.g., video content) as corresponding blocks in the other ones of the container files. For example, the cluster/block indicated at A in container file 508(1) has encoded therein the same video as that encoded in the clusters/blocks indicated at B, C, and D of container files 508(2), 508(3), and 508(4), respectively. Corresponding blocks are also referred to herein as "co-located" blocks because they encode the same video and share the same time code TC, i.e., they are aligned or coincide in time.

Container files may encode a single stream, such as a video stream (as depicted in FIG. 5), an audio stream, or a text stream (e.g., subtitles). Alternatively, each container file may encode multiple multiplexed streams, such as a mix of video, audio, and text streams. In addition, a container file may encode only a metadata stream at a relatively low bitrate.

The encoded container files depicted in FIG. 5 support adaptive streaming to client device 104. If conditions at client device 104 change while streaming, then the client device may switch between container files to stream at encoding bitrates best suited to the conditions.

In embodiments: the container files may be Matroska (MKV) containers based on Extensible Binary Meta Language (EBML), which is a derivative of Extensible Binary Meta Language (XML), or files encoded in accordance with the Moving Picture Experts Group (MPEG) standard; the program index may be provided in a Synchronized Multimedia Integration Language (SMIL) format; and client device 104 may download container files from CDN 108 over networks 106 using the HTTP protocol.

The container files described above may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

Method Flowcharts

Adaptive Bitrate Streaming

Figure 6:
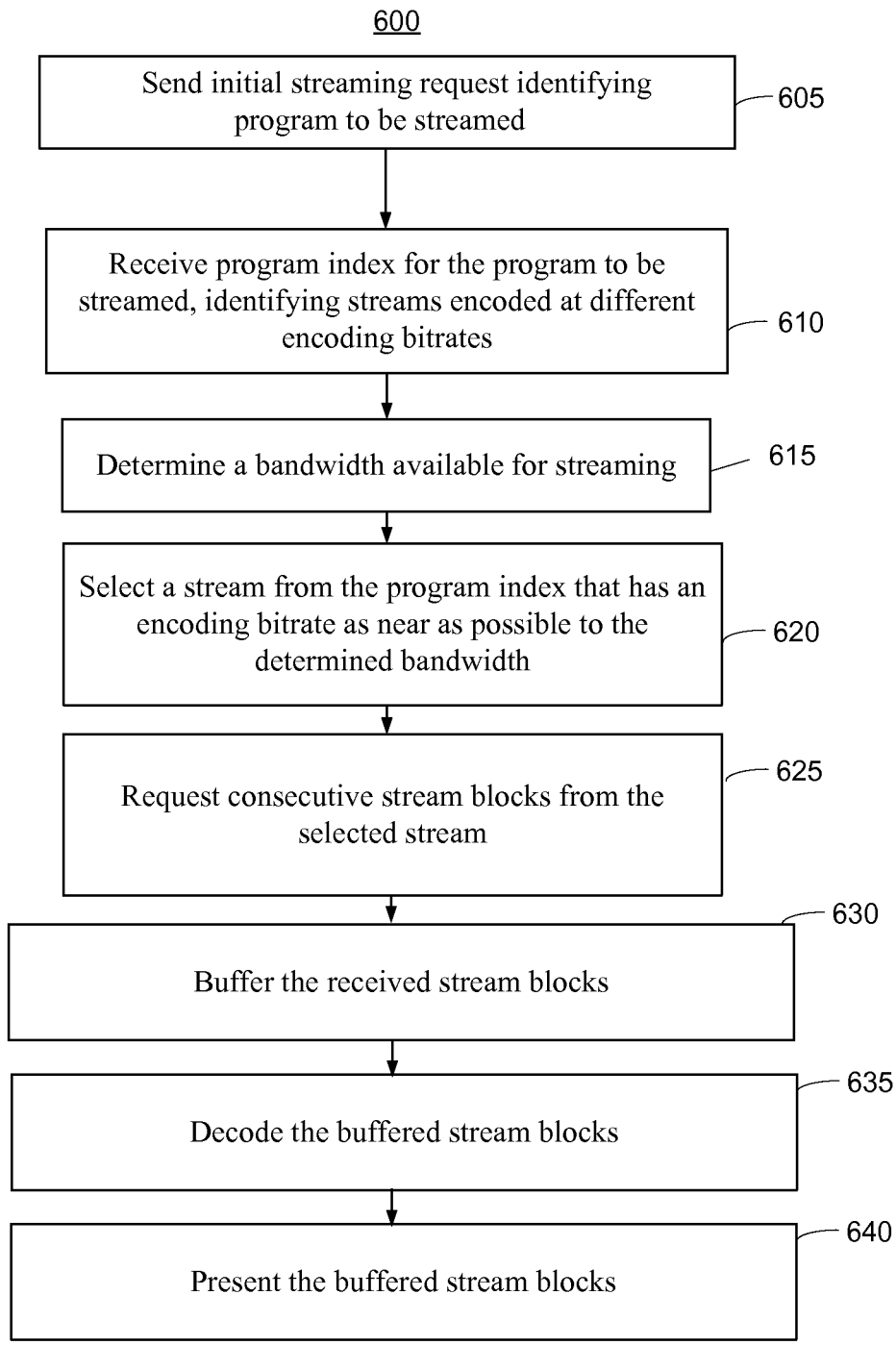
FIG. 6 is a flowchart of an example method of streaming multimedia content for playback (i.e., "streaming") on a client device.

FIG. 6 is a flowchart of an example method 600 of streaming multimedia content for playback (i.e., "streaming") on client device 104. The operations of method 600 are performed in client device 104.

At 605, the client device sends a stream request identifying content, e.g., a program to be streamed.

At 610, the client device receives a program index (e.g., program index 504) for the program to be streamed, identifying alternative streams encoded at different encoding bitrates.

At 615, the client device determines a bandwidth available for streaming.

At 620, the client device selects a stream from the program index that has an encoding bitrate as near as possible to the determined available bandwidth.

At 625, client device requests consecutive stream blocks from the selected stream.

At 630 the client device receives and buffers the received stream blocks in a stream buffer of the client device. In other words, the client device downloads the requested blocks to the stream buffer. The stream buffer is different from, and typically relatively smaller than, cache buffer 140.

At 635, the client device decodes the buffered stream blocks.

At 640, the client device presents, or plays back, the decoded stream blocks on the client device. For example, the decoded stream blocks may be played back in audio-visual form if the streamed multimedia content is an audio-visual program.

The client device repeats operations 615-640 over time and may select a different stream, i.e., switch streams, at 620. Accordingly, the streaming of method 600 is referred to as adaptive streaming.

Multimedia Content Streaming with Cache Assist

Figure 7:
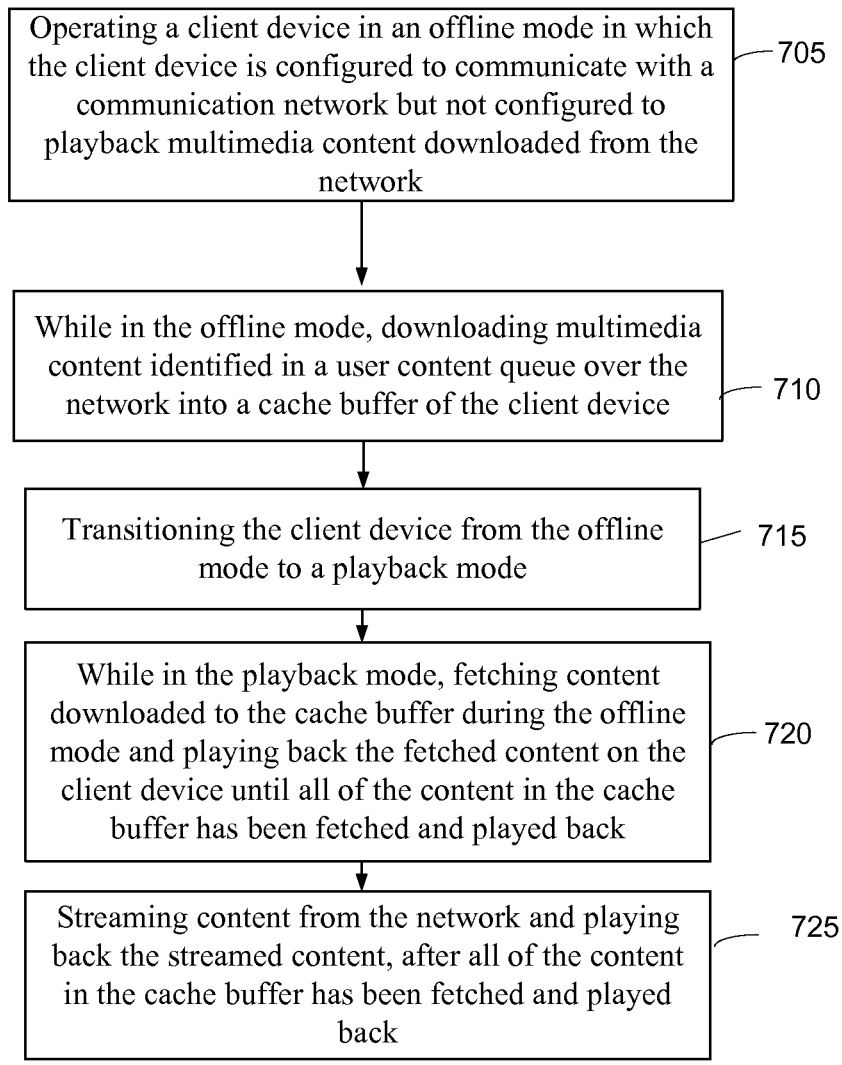
FIG. 7 is a flowchart of an example method of downloading and streaming multimedia content for playback on a client device with cache assist.

FIG. 7 is a flowchart of an example method 700 of downloading and streaming multimedia content to client device 104 with cache assist, for playback on the client device. In an embodiment, the operations of method 700 are performed in client device 104.

705 includes operating the client device in an offline mode in which the client device is configured to communicate with a communication network but not configured to playback multimedia content downloaded from the network.

710 includes, while in the offline mode, downloading multimedia content (in its encoded form) identified in a user content queue over the network into a cache buffer (which represents the "cache assist") of the client device.

715 includes transitioning the client device from the offline mode to a playback mode.

720 includes, while in the playback mode, fetching content downloaded to the cache buffer during the offline mode and playing back the fetched content on the client device.

725 includes streaming content (in its encoded form) from the network and playing back the streamed content, after all of the content in the cache buffer has been fetched and played back.

The playback operation includes first decoding the downloaded or streamed (encoded) content and then presenting the decoded content on the client device.

Content Downloads Based on Network

Figure 8:
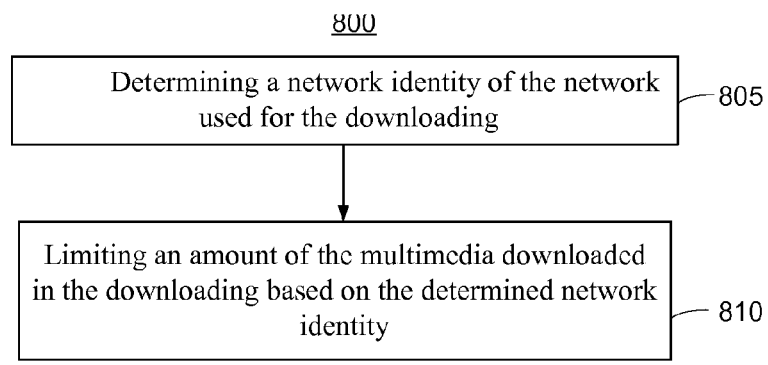
FIGS. 8, 9, and 10 are flowcharts of an example methods, expanding on the method of FIG. 7, that modify content downloads to a client device cache buffer based on a variety of inputs and factors.

FIG. 8 is a flowchart of an example method 700, expanding on method 600, that limits a size of a content download based on a network on which the download occurred. In an embodiment, the operations of method 800 are performed in client device 104.

805 includes determining a network identity of the network used for the downloading.

810 includes limiting an amount of the multimedia downloaded in the downloading based on the determined network identity.

Content Downloads Based on Geo-Location

Figure 9:
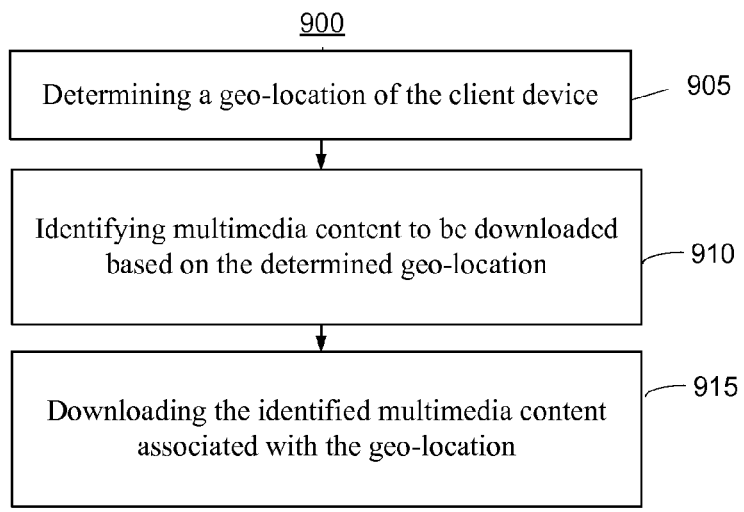

FIG. 9 is a flowchart of an example method 900, further expanding on method 600, in which content downloads are based on a geo-location. In an embodiment, the operations of method 900 are performed in client device 104.

905 includes determining a geo-location of the client device.

910 includes identifying multimedia content to be downloaded based on the determined geo-location.

915 includes downloading the identified multimedia content associated with the geo-location.

Content Downloads Based on Calendar Entries

Figure 10:
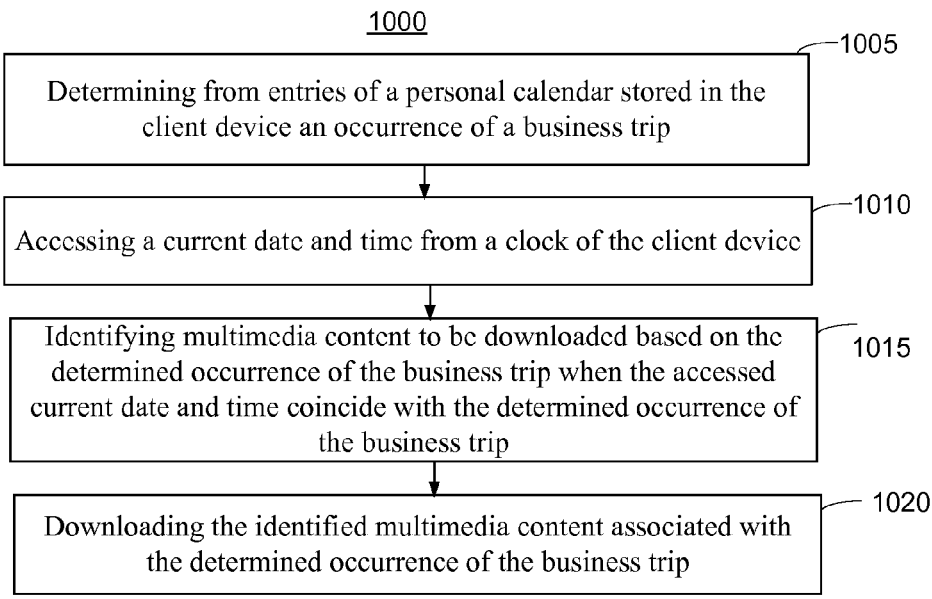

FIG. 10 is a flowchart of an example method 1000, further expanding on method 600, in which content downloads are based on calendar entries. In an embodiment, the operations of method 1000 are performed in client device 104.

1005 includes determining from entries of a personal calendar stored in the client device an occurrence of a business trip;

1010 includes accessing a current date and time from a clock of the client device;

1015 includes identifying multimedia content to be downloaded based on the determined occurrence of the business trip when the accessed current date and time coincide with the determined occurrence of the business trip; and 1020 includes downloading the identified multimedia content associated with the determined occurrence of the business trip.

Systems

Methods and systems disclosed herein may be implemented with respect to one or more of a variety of systems including one or more consumer systems, such as described below with reference to FIGS. 11 and 12. Methods and systems disclosed herein are not, however, limited to the examples of FIGS. 11 and 14.

Figure 11:
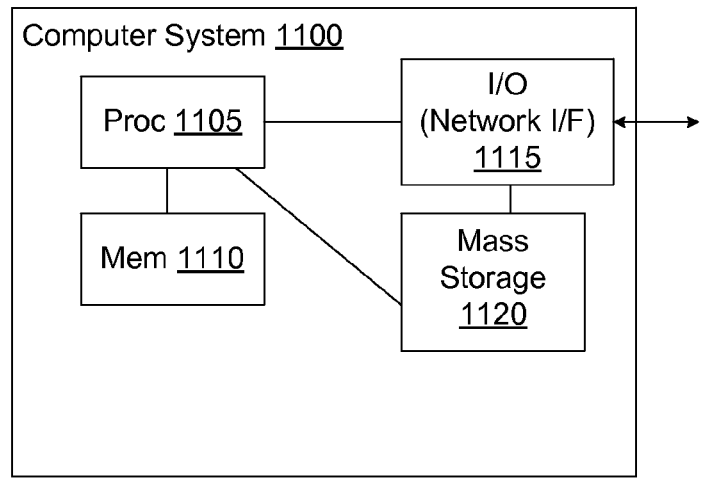
FIG. 11 is a block diagram of an example computer system.

FIG. 11 is a block diagram of an example computer system 1100 corresponding to any of network services 102, including cloud storage 110, CDN 108 (and its download servers 126, and encoders 120), and intelligent cache service 114a. Computer system 1100, which may be, e.g., a server, includes one or more processors 1105, a memory 1110 in which instruction sets and databases for computer program applications are stored, a mass storage 1120 for storing, e.g., encoded programs, and an input/output (I/O) module 1115 through which components of computer system 1100 may communicate with communication network 106.

Figure 12:
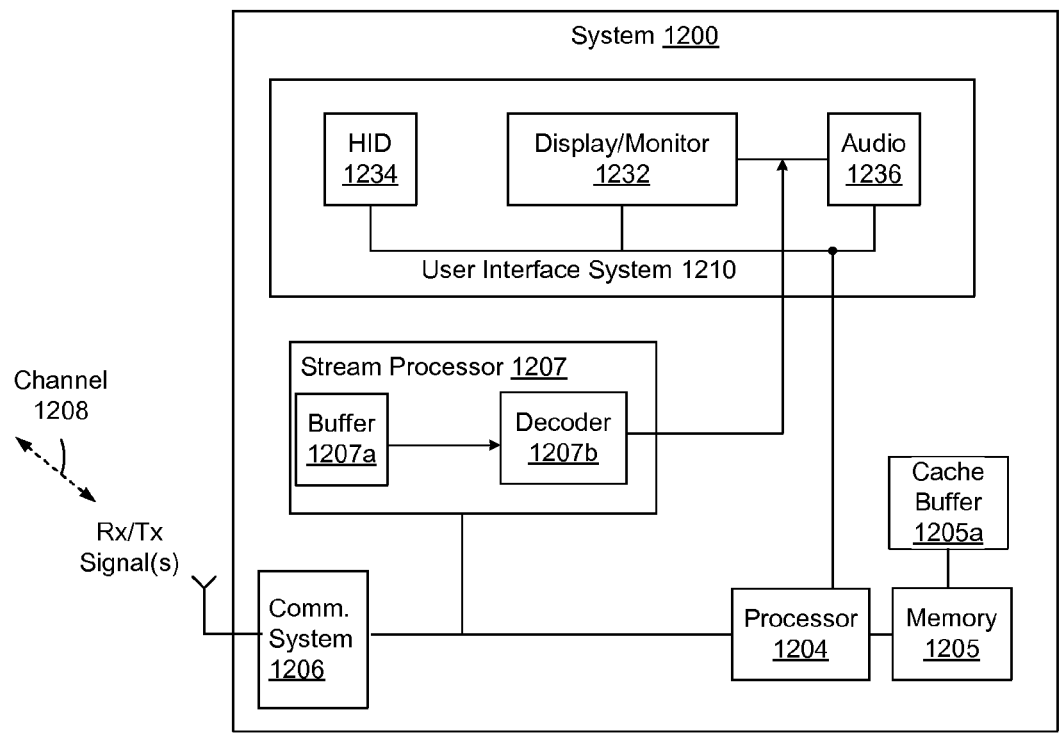
FIG. 12 is a block diagram of an example client device.

FIG. 12 is a block diagram of an example system 1200 representing, e.g., client device 104, and may be implemented, and configured to operate, as described in one or more examples herein.

System 1200 or portions thereof may be implemented within one or more integrated circuit dies, and may be implemented as a system-on-a-chip (SoC).

System 1200 may include one or more processors 1204 to execute client-side application programs stored in memory 1205. System 1200 includes cache buffer 140, which may be part of memory 1205, and/or be implemented as external, large scale data store.

System 1200 may include a communication system 1206 to interface between processors 1204 and communication networks, such as networks 106 over a communication channel 1208. Communication system 1206 may include a wired and/or wireless communication system.

System 1200 may include a stream processor 1207 to process program (i.e., content) streams, received over channel 1208 and through communication system 1206, for presentation at system 1200. Stream processor 1207 includes a stream buffer 1207a to buffer portions of received, streamed programs, and a decoder 1207b to decode and decrypt the buffered programs in accordance with encoding and encryption standards, and using decryption keys. In an alternative embodiment, decoder 1207b may be integrated with a display and graphics platform of system 1200. Stream processor 1207 together with processors 1204 and memory 1205 represent a controller of system 1200. This controller includes modules to perform the functions of one or more examples described herein, such as a streaming module to stream programs through communication system 1206.

System 1200 may include a user interface system 1210.

User interface system 1210 may include a monitor or display 1232 to display information from processor 1204, such as client-side storefront GUIs.

User interface system 1210 may include a human interface device (HID) 1234 to provide user input to processor 1204. HID 1234 may include, for example and without limitation, one or more of a key board, a cursor device, a touch-sensitive device, and or a motion and/or image sensor. HID 1234 may include a physical device and/or a virtual device, such as a monitor-displayed or virtual keyboard.

User interface system 1210 may include an audio system 1236 to receive and/or output audible sound.

In an offline mode of system 1200, communication system 1206, processor 1204, memory 1204, and cache buffer 1205 are operative to download and store multimedia content into the cache buffer; but stream processor 1207 and user interface system 1210 may not be operative to stream and playback content.

In a playback mode of system 1200, stream processor 1207 may access the content downloaded to cache buffer 1205a during the offline mode, and decode the accessed content. The decoded content may be presented to a user through user interface system 1210, i.e., played back through the user interface system. In addition, stream processor 1207 is operative to stream content from a network.

System 1200 may be transitioned from the offline mode to the playback mode in accordance with user input through user interface system 1210.

System 1200 may correspond to, for example, a computer system, a personal communication device, and/or a television set-top box.

System 1200 may include a housing, and one or more of communication system 1206, processors 1204, memory 1205, user interface system 1210, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1202 may be implemented to receive a digital television broadcast signal, and system 1200 may include a set-top box housing or a portable housing, such as a mobile telephone housing.

Figure 13:
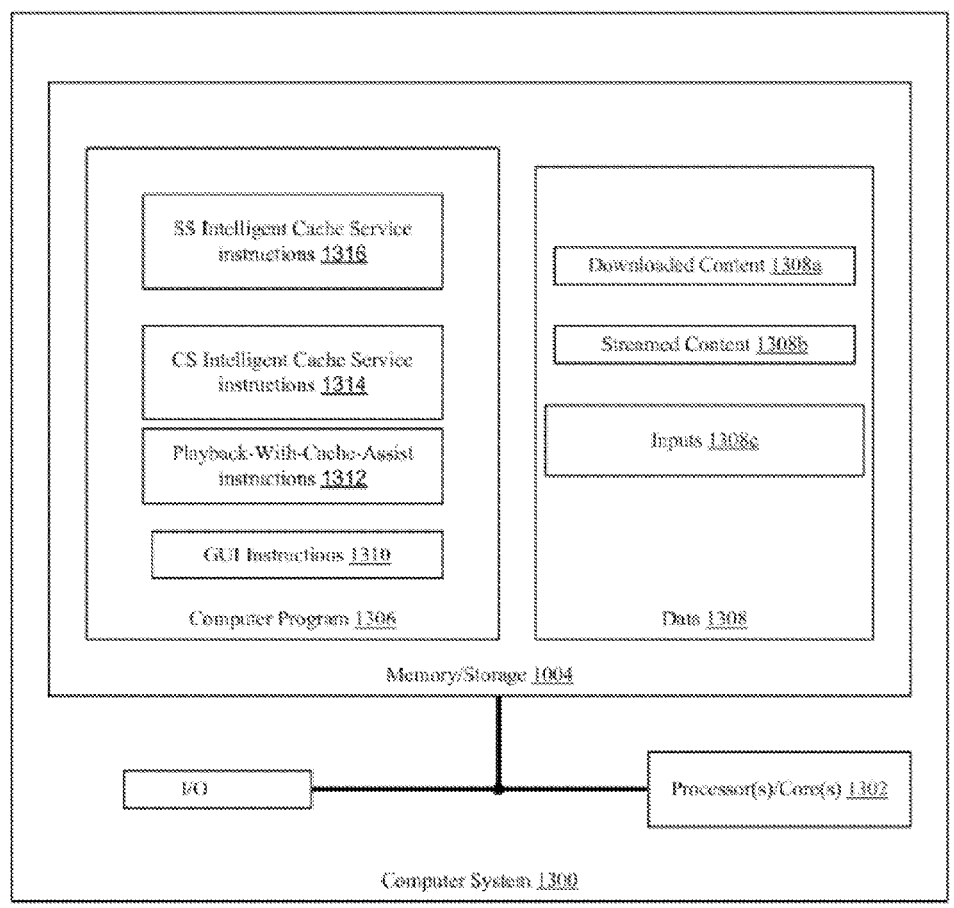
FIG. 13 is a block diagram of a computer program support system.

FIG. 13 is a block diagram of a computer system 1300 configured to support embodiments described herein.

Computer system 1300 includes one or more computer instruction processing units and/or processor cores, illustrated here as processor 1302, to execute computer readable instructions, also referred to herein as computer program logic.

Computer system 1300 may include memory, cache, registers, and/or storage, illustrated here as memory 1304, which may include a non-transitory computer readable medium encoded with computer programs, illustrated here as computer program 1306.

Memory 1304 may include data 1308 to be used by processor 1302 in executing computer program 1306, and/or generated by processor 1302 during execution of computer program 1306. Data 1308 may include content 1308a stored in a cache buffer, streamed content 1308b, and inputs 1308c corresponding to inputs 400 discussed above in connection with FIG. 4, such as used in the methods described herein.

Computer program 1306 may include:

GUI instructions 1310 to cause processor 1302 to implement a GUI on a client device, as described herein;

playback-with-cache-assist instructions 1312 to cause processor 1302 to playback content stored in a cache buffer and stream content from a network while a client device operates in a playback mode; and client-side (CS) intelligent cache service instructions 1314 to cause processor 1302 to download content while a client device operates in an offline mode; and server-side (CS) intelligent cache service instructions 1316 to cause processor 1302 to download content while a client device operates in an offline mode.

Instructions 1310-1316 cause processor 1302 to perform functions such as described in one or more examples above.

Computer system 1300 is depicted as one system in FIG. 13. However, CS instructions 1314 and SS instructions 1316 reside in client-side and server-side systems, respectively, as depicted in FIG. 1.

Methods and systems disclosed herein may be implemented in circuitry and/or a machine, such as a computer system, and combinations thereof, including discrete and integrated circuitry, application specific integrated circuitry (ASIC), a processor and memory, and/or a computer-readable medium encoded with instructions executable by a processor, and may be implemented as part of a domain-specific integrated circuit package, a system-on-a-chip (SOC), and/or a combination of integrated circuit packages.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method performed by a first apparatus comprising a processor, a non-volatile memory, and a cache buffer, the method comprising:

uploading multimedia content associated with the first apparatus to a particular cloud storage using the processor of the first apparatus;

transitioning the first apparatus into an offline mode in which the first apparatus is configured to communicate with a communication network and not playback multimedia content downloaded from the network using the processor;

determining network usage rates by the first apparatus on a set of networks during the offline mode communication with the communication network using the processor;

determining a geo-location of the first apparatus during the offline mode communication with the communication network using the processor;

identifying entries in a personal calendar stored in the non-volatile memory of the first apparatus relating to business travel during the offline mode using the processor;

selecting and downloading, during the offline mode and using the processor, a plurality of initial portions of content based on factors comprising:

a comparison of the determined network usage rates to a set of conditions and costs for amounts of data that can be downloaded by the first apparatus on the set of networks for given time periods;

a comparison of the determined geo-location of the first apparatus with a set of location links in a location links database, wherein upon identification of a coincidence of the first apparatus with a particular linked location, the first apparatus retrieves multimedia content from a second cloud storage associated with a second apparatus;

a comparison of a current date and time from a clock of the first apparatus with a set of content links in a content links database indicating associations between calendar instances of business travel and particular portions of content;

storing, during the offline mode and using the processor, the downloaded plurality of initial portions of content in the cache buffer;

transitioning the first apparatus from the offline mode to a playback mode using the processor; and fetching, during the playback mode and using the processor, content stored in the cache buffer during the offline mode and playing back the fetched content on the first apparatus.

2. The method of claim 1, wherein the multimedia content includes video and audio.

3. The method of claim 1, further comprising, while in the playback mode:

fetching all of the content downloaded to the cache buffer and playing back the fetched content on the first apparatus until all of the content in the cache buffer has been fetched and played back; and streaming content from the network and playing back the streamed content, after all of the content in the cache buffer has been fetched and played back.

4. The method of claim 3, wherein:

the multimedia content downloaded to the cache buffer during the offline mode includes multiple complete programs and an incomplete program having an initial segment downloaded to the cache buffer and remaining segments that are not downloaded to the cache buffer;

the fetching and playing back includes fetching and playing back the multiple complete programs and the initial segment of the incomplete program from the cache buffer; and the streaming includes streaming the remaining segments from the network and the playing back includes playing back the remaining streamed segments.

5. The method of claim 3, further comprising: limiting an amount of the multimedia downloaded in the downloading based on the comparison of the determined network usage rates to the set of conditions.

6. The method of claim 3, wherein the factors further comprise a comparison of multimedia content to a preference list indicating preferred multimedia content.

7. A first apparatus, comprising:
a processor;
a non-volatile memory storing an intelligent caching application;
a communication system;
a cache buffer;
wherein, upon execution by the processor, the intelligent cache application directs the processor to:
upload multimedia content associated with the first apparatus to a particular cloud storage using the processor of the first apparatus;
transition the first apparatus into an offline mode in which the first apparatus is configured to communicate with a communication network and not playback multimedia content downloaded from the network;
determine network usage rates by the first apparatus on a set of networks during the offline mode communication with the communication network using the processor;
determine a geo-location of the first apparatus during the offline mode communication with the communication network using the processor;
identify entries in a personal calendar stored in the non-volatile memory of the first apparatus relating to business travel during the offline mode using the processor;
select and download, during the offline mode and using the processor, a plurality of initial portions of content based on factors comprising:
a comparison of the determined network usage rates to a set of conditions and costs for amounts of data that can be downloaded by the first apparatus on the set of networks for given time periods;
a comparison of the determined geo-location of the first apparatus with a set of location links in a location links database, wherein upon identification of a coincidence of the first apparatus with a particular linked location, the first apparatus retrieves multimedia content from a second cloud storage associated with a second apparatus;
a comparison of a current date and time from a clock of the first apparatus with a set of content links in a content links database indicating associations between calendar instances of business travel and particular portions of content;
store, during the offline mode and using the processor, the downloaded plurality of initial portions of content in the cache buffer;
transition the first apparatus from the offline mode to a playback mode; and
fetch, during the playback mode and using the processor, content stored in the cache buffer during the offline mode and play back the fetched content on the first apparatus.

8. The apparatus of claim 7, wherein the multimedia content includes video and audio.

9. The apparatus of claim 7, wherein the first apparatus is further configured to, in the playback mode:
fetch content downloaded to the cache buffer, and playback the fetched content on the first apparatus, until all of the content in the cache buffer has been fetched and played back; and stream content from the network and playback the streamed content, after all of the content in the cache buffer has been fetched and played back.

10. The apparatus of claim 9, wherein:
the multimedia content downloaded to the cache buffer during the offline mode completely includes multiple complete programs and an incomplete program having an initial segment downloaded to the cache buffer and remaining segments that are not downloaded to the cache buffer; and
the first apparatus is further configured to, in the playback mode:
fetch and playback the multiple complete programs and the initial segment of the incomplete program; and
stream the remaining segments over the network and the playback the remaining streamed segments.

11. The apparatus of claim 9, wherein the first apparatus is further configured to, in the offline mode:
limit an amount of the multimedia downloaded based on the comparison of the determined network usage rates to the set of conditions.

12. The apparatus of claim 9, wherein the factors further comprise a comparison of multimedia content to a preference list indicating preferred multimedia content.

13. The apparatus of claim 7, further comprising:
a user interface system;
a housing to house the communication system, the cache buffer, the user interface system, and the processor.

14. The apparatus of claim 13, wherein:
the communication system includes a wireless communication system; and
the housing includes a mobile hand-held housing to house the communication system, the cache buffer, the user interface system, the processor, and a battery.

15. A non-transitory computer readable medium encoded with a computer program including instructions to cause a processor in a first apparatus to:
upload multimedia content associated with the first apparatus to a particular cloud storage using the processor of the first apparatus, wherein the first apparatus comprises the processor, a non-volatile memory, and a cache buffer;
transition the first apparatus into an offline mode in which the first apparatus configured to communicate with a communication network and not playback multimedia content downloaded from the network;
determine network usage rates by the first apparatus on a set of networks during the offline mode communication with the communication network using the processor;
determine a geo-location of the first apparatus during the offline mode communication with the communication network using the processor;
identify entries in a personal calendar stored in the non-volatile memory of the first apparatus relating to business travel during the offline mode using the processor;
select and download, during the offline mode and using the processor, a plurality of initial portions of content based on factors comprising:
a comparison of the determined network usage rates to a set of conditions and costs for amounts of data that can be downloaded by the first apparatus on the set of networks for given time periods;
a comparison of the determined geo-location of the first apparatus with a set of location links in a location links database, wherein upon identification of a coincidence of the first apparatus with a particular linked location, the first apparatus retrieves multimedia content from a second cloud storage associated with a second apparatus;
a comparison of a current date and time from a clock of the first apparatus with a set of content links in a content links database indicating associations between calendar instances of business travel and particular portions of content;
store, during the offline mode and using the processor, the downloaded plurality of initial portions of content in the cache buffer;
transition the first apparatus from the offline mode to a playback mode; and
fetch, during the playback mode, content stored in the cache buffer during the offline mode and playback the fetched content on the first apparatus.

16. The non-transitory computer readable medium of claim 15, wherein the multimedia content includes video and audio.

17. The non-transitory computer readable medium of claim 15, wherein the instructions further include instruction to cause the processor to, while in the playback mode:
fetch all of the content downloaded to the cache buffer and playback the fetched content on the first apparatus until all of the content in the cache buffer has been fetched and played back; and stream content from the network and playback the streamed content, after all of the content in the cache buffer has been fetched and played back.

18. The non-transitory computer readable medium of claim 17, wherein:
the multimedia content downloaded to the cache buffer during the offline mode includes multiple complete programs and an incomplete program having an initial segment downloaded to the cache buffer and remaining segments that are not downloaded to the cache buffer;
the instructions to fetch and playback further include instructions to cause the processor to fetch and play back the multiple complete programs and the initial segment of the incomplete program; and
the instructions to cause the processor to stream further include instructions to cause the processor to stream the remaining segments over the network and the playing back includes playing back the remaining streamed segments.

19. The non-transitory computer readable medium of claim 17, wherein the instructions further include instructions to cause the processor to:
limit an amount of the multimedia downloaded in the downloading based on the the comparison of the determined network usage rates to the set of conditions.

20. The non-transitory computer readable medium of claim 17, wherein the factors further comprise a comparison of multimedia content to a preference list indicating preferred multimedia content.

* * * * *